April 9, 1940. J. GALTER 2,196,604
CAMERA
Filed April 19, 1939
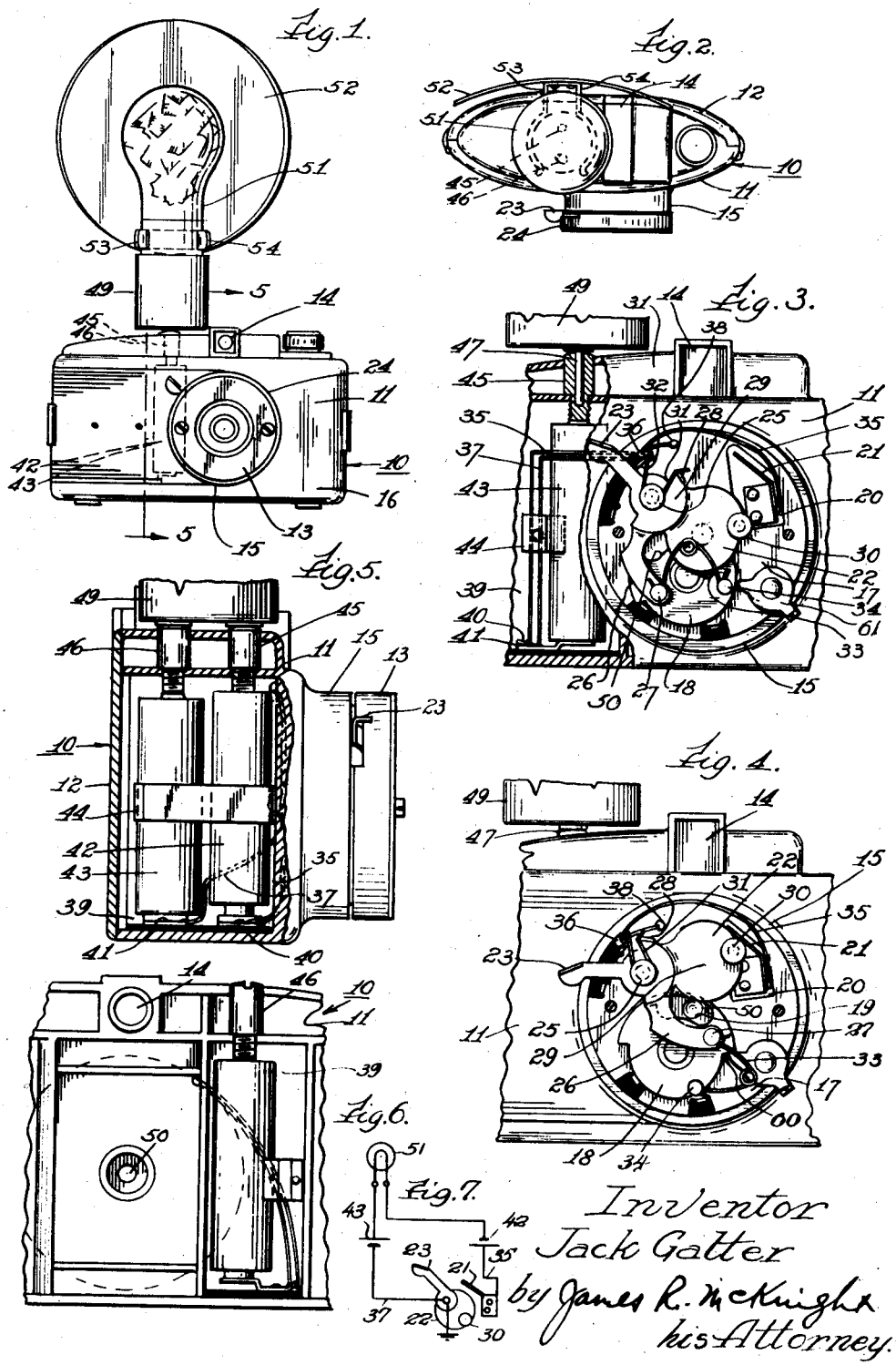
Inventor
Jack Galter
by James R. McKnight
his Attorney Patented Apr. 9, 1940

2,196,604

UNITED STATES PATENT OFFICE 2,196,604

CAMERA

Jack Galter, Chicago, Ill.

Application April 19, 1939, Serial No. 268,779

3 Claims. (Cl. 67—29)

My invention relates to a camera having a built-in and electrically operated synchronized photo-flash means.

Among the objects of my invention is to provide a camera having a built-in and electrically operated synchronized photo-flash unit so as to eliminate the bulky and awkward photo-flash gun and the need of extraneous attachments. To create a camera having special shutter action synchronized with the photo-flash means and designed for use under any lighting conditions. To supply a camera having space for batteries having long life current supply. To provide a detachable photo-flash means so that sunlight snaps may be taken without the use of a flash bulb. To create an extension device for special interior shots, and such other objects, advantages and capabilities as will later more fully appear and which are inherently possessed by my invention.

While I have shown in the accompanying drawing a preferred embodiment of my invention yet I wish it understood that the same is susceptible of modification and change without departing from the spirit of my invention.

Referring more particularly to the drawing Fig. 1 is a front elevational view of my camera, and Fig. 2 is a top plan view of the same; Fig. 3 is a detail sectional elevational view of my flash operating switch in open position with part of the casing broken away showing batteries; Fig. 4 is a detailed sectional elevational view of the switch in closed position; Fig. 5 is a sectional view on line 5—5 of Fig. 1 cut away to show the batteries, Fig. 6 is a rear elevational view showing compartment for batteries and Fig. 7 is a diagram of the electrical circuit.

The embodiment selected to illustrate my invention comprises a camera 10 having a casing 11, with a removable back 12, lens 13 and sighting means 14.

The casing 11 has a raised portion 15 on its front face 16. Attached to said raised portion 15, which like the rest of the casing is of plastic material such as Bakelite or any other suitable non-conductor material, is a metal base plate 17. A shutter plate 18 is pivotally attached to said base plate 17, and in normal position covers the shutter opening 19 in the base plate 17. The shutter plate 18 has offset portions 60 to engage a pivoted stop member 61.

In a cut out portion 20 in the base plate 17 a metal contact member 21 is attached to the raised portion 15 of the casing 11 and is insulated from the other conductor elements.

A trigger 22 has a manually operable finger piece 23 extending externally through cap 24 which covers the raised portion 15. The trigger 22 is pivotally attached to the base plate 17 by pivot pin 25 and has an arm 26 with a knob 27, a turned up portion 28 and a plate portion 29 with a pin 30 attached adjacent to and extending beyond the outer edge of the plate.

A spring 31 extends between turned up portion 28 and stop member 32. Another spring 33 of the safety pin type extends between knob 27 and another knob 34 in the shutter plate 18.

A wire 35 leads from the contact member 21 through an opening 36, in the base plate 17 and raised portion 15. A second wire 37 is soldered to the base plate 17 at point 38 just above turned up portion 28 and also leads through opening 36.

Wires 35 and 37 lead to a section 39 of the casing 11 where they are attached to contact springs 40 and 41 respectively which are attached to the bottom of casing 11. Said section 39 of casing 11 is adapted to hold two pen-cell batteries 42 and 43, the lower portions of which engage contact springs 40 and 41.

Batteries 42 and 43 are held within section 39 by means of a spring 44 which is attached to the front of casing 11. The upper terminals of batteries 42 and 43 engage contact members 45 and 46 respectively which extend through the top of casing 11. Said contact members 45 and 46 are adapted to receive poles 47 and 47 of bulb attachment 49. Bulb attachment 49 is adapted to receive a light bulb 51 of the photoflash type. A reflector 52 engages bulb 51 or bulb attachment 49 by means of tension arms 53 and 54.

In operation one of my batteries is connected by wire 37 to the base plate 17 and the other battery is connected by wire 35 to contact spring 21. When finger piece 23 of trigger 22 is pressed downward, tension is created in spring 33 causing shutter plate 18 to rotate and bring opening 50 of shutter plate 18 in line with shutter opening 19 in the base plate 17 through cooperation of offset portions 60 and pivoted stop member 61.

The film is thus exposed before the electric circuit is completed in order to prevent discharge of the flash bulb before the shutter is open and the film exposed. The film remains exposed until after the electric circuit has been completed and the flash bulb discharged.

Due to the downward pressure exerted on the trigger finger 23, plate portion 29 of the trigger mechanism 22 is moved upward so that pin 30 engages contact member 21. This completes the electric circuit and causes the discharge of flash bulb 51. When trigger finger 23 is released, springs 31 and 33 return the trigger 22 and shutter plate 29 to their normal positions, so that shutter opening 19 is again covered.

Having thus described my invention, I claim:

1. A camera comprising a lens, a casing, said casing having transverse partitions forming sections for the reception of film and batteries, a pair of batteries positioned within one of said sections, a resilient member attached to said casing and extending within said section to retain said batteries in said section, a base plate attached to the front of said casing having a shutter opening, a shutter plate pivotally attached to said base plate for normally closing said shutter opening, a contact member attached to the front of said casing, a trigger member pivotally attached to said base plate and having a finger piece manually operable from the exterior of the device, and a contact pin, a spring attached to and extending between the trigger member and the shutter plate, means connecting the base plate with one of the batteries, means connecting the contact member with the other battery and means comprising plug-in jacks carried by said casing and protruding therethrough for contacting said batteries and for ready insertion of a flash bulb socket on the exterior thereof, said trigger member when pivoted by manual operation exerting pressure on the spring connecting it with the shutter plate to pivot the shutter plate so as to expose the shutter opening and to then bring the contact pin in contact with the contact member so as to close the electrical circuit and cause the discharge of the flash bulb while the shutter opening is exposed.

2. A camera comprising a casing having a shutter opening, said casing having transverse partitions forming sections for the reception of film and batteries, a pair of batteries positioned within one of said sections, a contact member attached to said casing, means connecting the contact member with one of the batteries, and means comprising plug-in jacks carried by said casing and protruding therethrough for contacting said batteries and for ready insertion of a flash bulb socket on the exterior thereof, a shutter plate pivotally attached to said casing and covering said shutter opening in normal position, a trigger member pivotally attached to said casing, means connecting the trigger member with the other battery, said trigger member having a finger piece and a contact member, resilient means connecting the trigger member with the shutter plate, said trigger member upon pressure on the finger piece pivoting upwardly to apply pressure on the resilient member to pivot in turn the shutter plate so as to expose the shutter opening, said trigger member continuing upwardly so as to move its contact member against contact member of the casing and complete the electrical circuit and cause the flash bulb to be discharged while the shutter opening is exposed.

3. In a camera having a transverse compartment within the body and intermediate the ends thereof slots extending through said body and into said compartment, a battery in said compartment, a flash bulb, synchronizing contacts operated by the shutter mechanism of said camera, and means for connecting said flash bulb in circuit with said synchronizing contacts and with said battery, said means including a flash bulb socket mounted on the exterior of said body immediately adjacent said compartment by circuit connecting prongs depending from said socket and extending through said slots.

JACK GALTER.